United States Patent
Oguri et al.

(10) Patent No.: US 10,493,632 B2
(45) Date of Patent: Dec. 3, 2019

(54) ROBOT CONTROL DEVICE FOR CONTROLLING ROBOT AND METHOD FOR ESTIMATING DISTURBANCE VALUE APPLIED TO ROBOT

(71) Applicant: FANUC CORPORATION, Yamanashi (JP)

(72) Inventors: Kenichiro Oguri, Yamanashi (JP); Soichi Arita, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 30 days.

(21) Appl. No.: 15/815,544

(22) Filed: Nov. 16, 2017

(65) Prior Publication Data

US 2018/0154526 A1 Jun. 7, 2018

(30) Foreign Application Priority Data

Dec. 2, 2016 (JP) ................................. 2016-235103

(51) Int. Cl.
| | |
|---|---|
| *B25J 9/16* | (2006.01) |
| *B25J 13/08* | (2006.01) |
| *B25J 19/06* | (2006.01) |
| *F16P 3/00* | (2006.01) |

(52) U.S. Cl.
CPC ........... *B25J 13/085* (2013.01); *B25J 9/1638* (2013.01); *B25J 9/1692* (2013.01); *B25J 9/1694* (2013.01); *B25J 19/063* (2013.01); *F16P 3/008* (2013.01); *G05B 2219/37537* (2013.01); *G05B 2219/39326* (2013.01)

(58) Field of Classification Search
CPC ...... B25J 9/1692; B25J 13/085; B25J 19/063; B25J 9/1638; B25J 9/1694; F16P 3/008; G05B 2219/37537; G05B 2219/39326
See application file for complete search history.

(56) References Cited

U.S. PATENT DOCUMENTS

| | | | |
|---|---|---|---|
| 6,430,473 B1 * | 8/2002 | Lee ........................ | B25J 9/162 318/568.16 |
| 6,575,317 B2 * | 6/2003 | Taylor .................. | B66C 13/063 212/270 |
| 2013/0061695 A1 | 3/2013 | Sato | |

(Continued)

FOREIGN PATENT DOCUMENTS

| | | |
|---|---|---|
| CN | 102990642 A | 3/2013 |
| CN | 103507070 A | 1/2014 |

(Continued)

*Primary Examiner* — Stephen Holwerda
(74) *Attorney, Agent, or Firm* — Hauptman Ham, LLP

(57) ABSTRACT

A robot control device able to accurately estimate an external force applied from a workpiece to a robot in a time-dependently changing manner. The robot control device includes a support force data acquisition section which acquires measurement data of a workpiece support force by the environment, the workpiece support force varying while the robot lifts the workpiece; a disturbance estimation section which estimates a disturbance value applied to the robot using state information of the robot; and a correction section which corrects, using the measurement data acquired by the support force data acquisition section, the disturbance value estimated by the disturbance estimation section or the state information inputted to the disturbance estimation section.

17 Claims, 10 Drawing Sheets

(56) References Cited

U.S. PATENT DOCUMENTS

| | | | | |
|---|---|---|---|---|
| 2014/0025205 A1* | 1/2014 | Inazumi | ................. | B25J 9/1694 |
| | | | | 700/258 |
| 2014/0107843 A1* | 4/2014 | Okazaki | ................. | B25J 13/085 |
| | | | | 700/260 |
| 2017/0156928 A1* | 6/2017 | He | ..................... | A61F 9/00727 |

FOREIGN PATENT DOCUMENTS

| | | |
|---|---|---|
| DE | 102015005212 A1 | 11/2015 |
| DE | 102015005908 A1 | 11/2015 |
| DE | 102015008577 A1 | 1/2016 |
| DE | 102015016341 A1 | 6/2016 |
| DE | 102016001643 A1 | 8/2016 |
| JP | H9-216185 A | 8/1997 |
| JP | 2002-355782 A | 12/2002 |
| JP | 2010-247309 A | 11/2010 |
| JP | 2015-208834 A | 11/2015 |
| JP | 2015-217451 A | 12/2015 |
| JP | 2016-16490 A | 2/2016 |
| JP | 2016-117141 A | 6/2016 |
| JP | 2016-153155 A | 8/2016 |

* cited by examiner

ROBOT CONTROL DEVICE FOR CONTROLLING ROBOT AND METHOD FOR ESTIMATING DISTURBANCE VALUE APPLIED TO ROBOT

RELATED APPLICATIONS

The present application claims priority to Japanese Patent Application No. 2016-235103 filed on Dec. 2, 2016, the disclosure of which is hereby incorporated by reference herein in its entirety.

BACKGROUND OF THE INVENTION

1. Field of the Invention

The invention relates to a robot control device for controlling a robot, and a method for estimating a disturbance value applied to a robot.

2. Description of the Related Art

A technique for estimating an external force applied to a robot has been known (e.g., Japanese Unexamined Patent Publication (Kokai) No. 2002-355782).

When a workpiece is lifted by a robot, during a process from a state in which the workpiece is in contact with an upper surface of a jig to a state in which the workpiece is separated from the upper surface, an external force applied from the workpiece to the robot is to change time-dependently. Thus, a technique for accurately estimating an external force which is applied from the workpiece to the robot and changes time-dependently has been demanded.

SUMMARY OF INVENTION

According to an aspect of the invention, a robot control device configured to control a robot which lifts a workpiece supported by an environment, includes a support force data acquisition section configured to acquire measurement data of a workpiece support force by the environment, which varies during the robot lifts the workpiece; and a disturbance estimation section configured to estimate a disturbance value applied to the robot with using state information of the robot.

The robot control device includes a correction section configured to correct the disturbance value estimated by the disturbance estimation section or the state information inputted to the disturbance estimation section, with using the measurement data acquired by the support force data acquisition section.

The correction section may be configured to obtain a varying workpiece load by subtracting the measurement data from a gravitational force applied to the workpiece, and to correct the disturbance value by subtracting the varying workpiece load from the disturbance value.

The disturbance the disturbance estimation section may estimate the disturbance value with using, as the state information, measurement data of a force sensor configured to measure a force applied to the robot. The correction section may be configured to obtain a component of the force applied to the robot due to the varying workpiece load, which is included in the measurement data of the force sensor, and to correct the disturbance value by subtracting the component from the disturbance value.

The correction section may be configured to obtain a varying workpiece load by subtracting the measurement data from a gravitational force applied to the workpiece, and correct the state information based on a state change due to the varying workpiece load. The disturbance estimation section may estimate the disturbance value with using the state information corrected by the correction section.

The robot may include a robot hand capable of gripping the workpiece. The correction section may correct the state information by subtracting a component due to the varying workpiece load from measurement data of a force sensor (92) configured to measure a force applied to the robot hand as the state information.

The robot control device may further include a follow command section configured to generate a command for operating the robot in accordance with the disturbance value when the disturbance value estimated by the disturbance estimation section exceeds a predetermined threshold value.

The robot control device may further include an operation command section configured to generate a command for stopping or retracting the robot when the disturbance value, which is corrected by the correction section or which is estimated by the disturbance estimation section with using the state information corrected by the correction section, exceeds a predetermined threshold value.

According to another aspect of the invention, a method of estimating a disturbance value applied to a robot which lifts a workpiece supported by an environment, includes acquiring measurement data of a workpiece support force by the environment, which varies during the robot lifts the workpiece; estimating a disturbance value applied to the robot with using state information of the robot; and correcting the estimated disturbance value or the state information with using the acquired measurement data.

DETAILED DESCRIPTION

Figure 1:
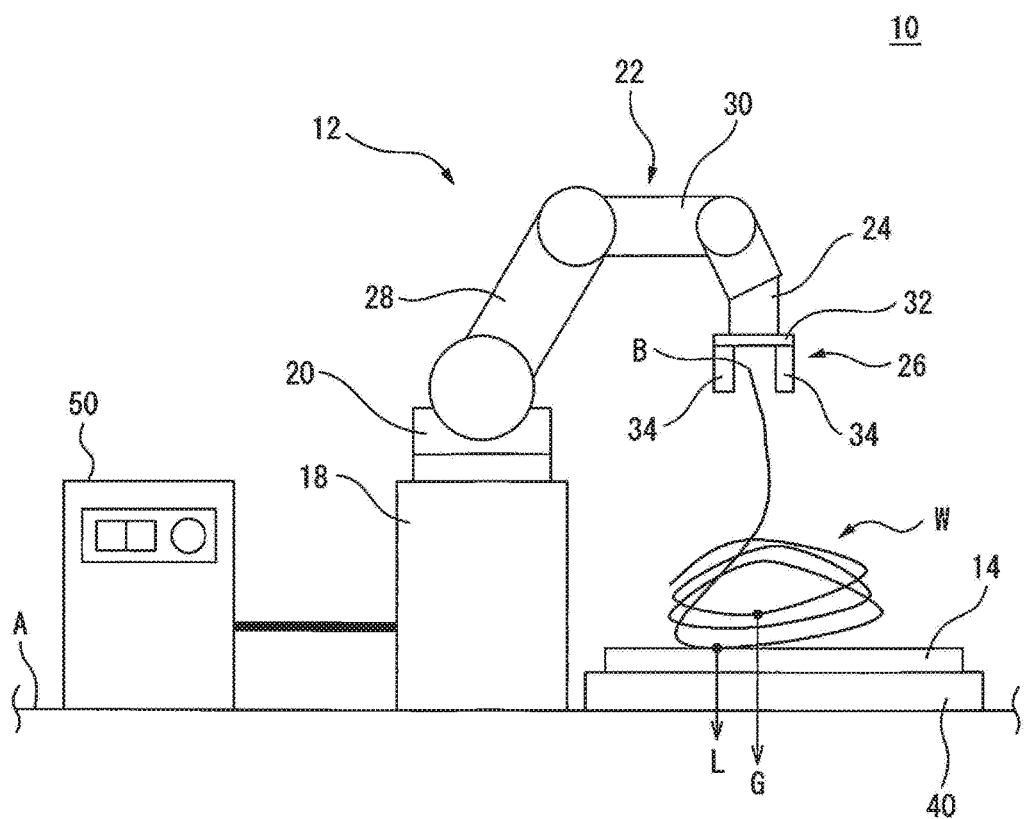
FIG. 1 is a diagram of a robot system according to one embodiment.

Hereinafter, embodiments of the invention will be described in detail with reference to the drawings. Note that, in the various embodiments described below, similar elements are assigned the same reference numerals, and detailed description thereof will be omitted. First, a robot system 10 according to an embodiment will be described with reference to FIGS. 1 and 2.

The robot system 10 is a system for lifting a workpiece W placed on an environment 40 and transporting it. In this embodiment, the workpiece W is a long flexible tubular member.

The robot system 10 includes a robot 12, a force sensor 14, and a robot control device 50. The robot 12 is a vertical articulated robot, and includes a robot base 18, a rotary barrel 20, a robot arm 22, a wrist 24, and a robot hand 26. The robot base 18 is fixed on a floor A of a work cell.

The rotary barrel 20 is provided at the robot base 18 so as to be rotatable about a vertical axis. The robot arm 22 includes an upper arm 28 rotatably mounted to the rotary barrel 20, and a forearm 30 rotatably mounted to a distal end of the upper arm 28. The wrist 24 is provided at a distal end of the forearm 30, and supports the robot hand 26 so as to be rotatable about three axes.

The robot hand 26 includes a hand base 32 connected to the wrist 24, a plurality of fingers 34 provided at the hand base 32 so as to be openable and closable, and a finger drive section (unillustrated) configured to drive the fingers 34.

The finger drive section includes e.g. an air cylinder, and opens and closes the fingers 34 in accordance with a command from the robot control device 50. Thus, the robot hand 26 is able to grip and release the workpiece W by opening and closing the fingers 34.

Figure 2:
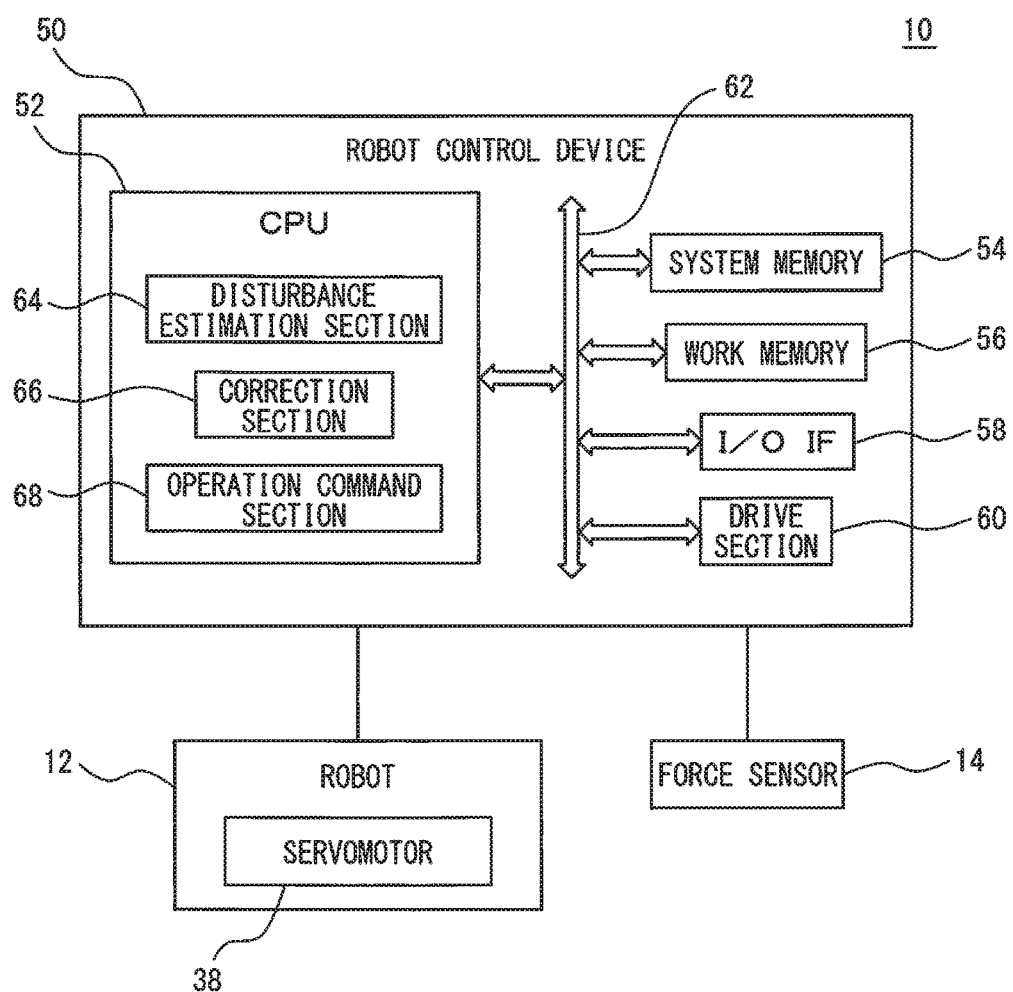
FIG. 2 is a block diagram of the robot system as illustrated in FIG. 1.

The robot 12 includes a plurality of servomotors 38 (FIG. 2). The servomotors 38 are incorporated in the rotary barrel 20, the robot arm 22, and the wrist 24, respectively, and rotate these elements about rotation axes in accordance with commands from the robot control device 50.

Each servomotor 38 includes a torque sensor or an encoder (unillustrated), and outputs feedback information, such as a load torque applied to the servomotor 38 or a rotation speed of the servomotors 38, to the robot control device 50.

The force sensor 14 is provided at the environment 40 on which the workpiece is placed, and measures a load L applied from the workpiece W to the environment 40. In this embodiment, the force sensor 14 is comprised of e.g. a strain gauge or a weight measurement device, and capable of detecting a load acted vertically downward. The force sensor 14 transmits measurement data of the measured load to the robot control device 50.

The robot control device 50 controls each component of the robot 12. Specifically, as illustrated in FIG. 2, the robot control device 50 includes a CPU 52, a system memory 54, a work memory 56, an input/output interface (I/O interface) 58, and a drive section 60.

The CPU 52 is communicably connected to the system memory 54, the work memory 56, and the I/O interface 58 via a bus 62, and executes various processes described later while communicating with these components.

The system memory 54 is an electrically erasable/recordable non-volatile memory, and comprised of e.g. EEPROM (registered trademark). The system memory 54 records a constant, a variable, a setting value, a program and the like necessary for CPU 52 to execute various processes so as not to lose them while the robot system 10 is shut down.

The work memory 56 temporarily stores data necessary for the CPU 52 to execute various processes. Further, the constant, variable, setting value, parameter, program and the like recorded in the system memory 54 are suitably loaded on the work memory 56, and the CPU 52 uses data loaded on the work memory 56 in order to execute various processes.

The I/O interface 58 is communicably connected to the force sensor 14, and receives the measurement data from the force sensor 14 in accordance with a command from the CPU 52. Further, the I/O interface 58 receives the feedback information transmitted from each servomotor 38. In addition, the I/O interface 58 is communicably connected to an external device, such as a display, a speaker, or a host controller, and communicates with such external device in accordance with a command from the CPU 52.

The I/O interface 58 is comprised of e.g. an Ethernet port or a USB port, and may communicate with the force sensor 14, each servomotor 38, and the external device in a wired manner. Alternatively, the I/O interface 58 may communicate with the force sensor 14, each servomotor 38, and the external device in a wireless manner, via Wi-Fi or other wireless LAN.

The drive section 60 drives each servomotor 38 incorporated in the robot 12 in accordance with a command from the CPU 52. Specifically, the drive section 60 includes e.g. an inverter or servo amplifier, and transmits a command (e.g., speed command, or torque command) to each servomotor 38 so as to drive the servomotors 38.

Figure 3:
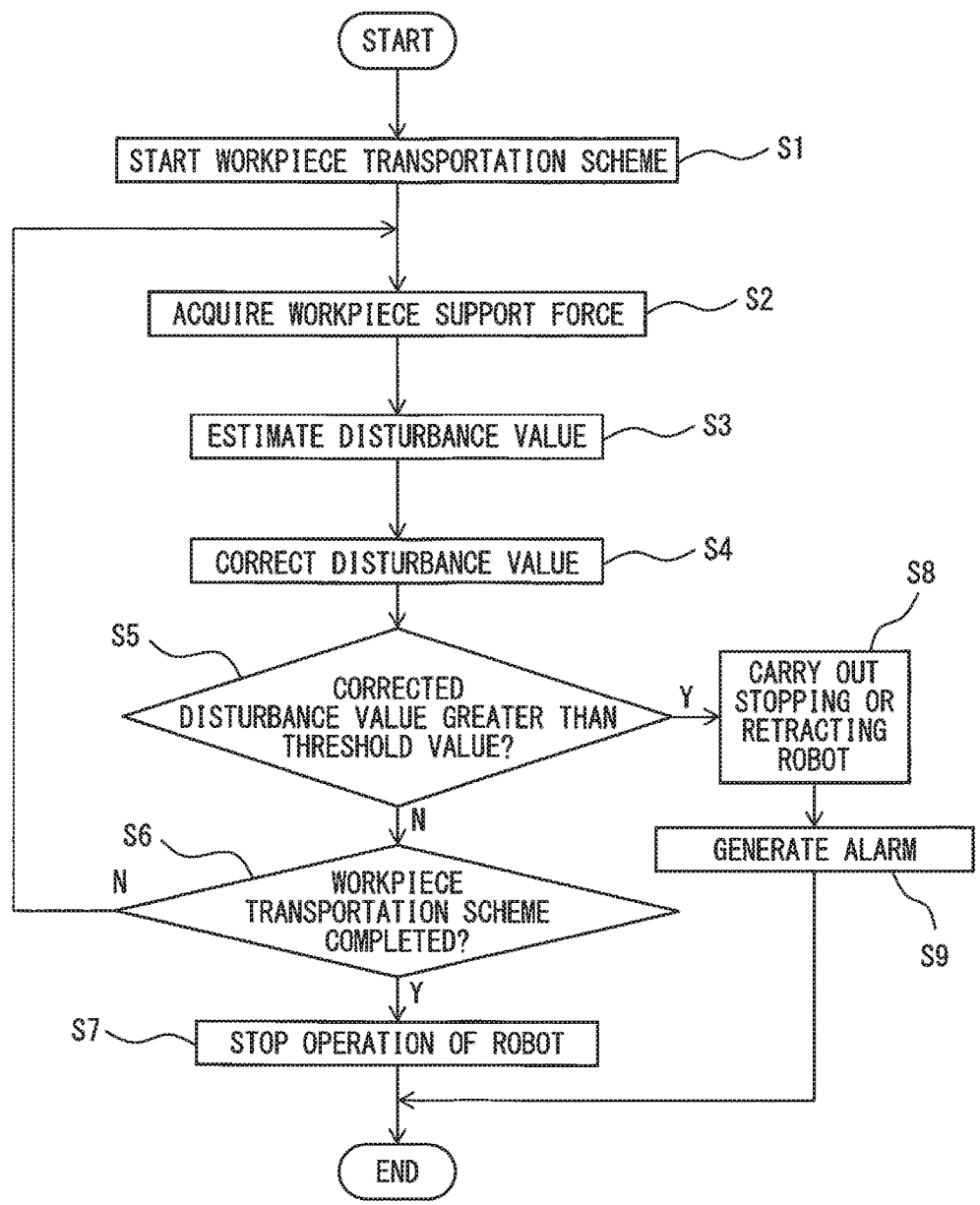
FIG. 3 is a flowchart illustrating an example of an operation flow of the robot system as illustrated in FIG. 1.

Next, an example of an operation of the robot system 10 will be described with reference to FIG. 3. A flow illustrated in FIG. 3 is started when the CPU 52 receives from an operator, host controller, a robot program or the like a transportation command for transporting the workpiece W.

At step S1, the CPU 52 carries out a workpiece transportation scheme. Specifically, the CPU 52 generates a command to each servomotor 38 in accordance with a robot program, and transmits it through the drive section 60 to each servomotor 38. Thus, the CPU 52 operates the robot 12 so as to grip and lift an end B of the workpiece W by the robot hand 26 to carry out a series of operation schemes for transporting the workpiece W.

At step S2, the CPU 52 acquires a force by which the workpiece W is supported by the environment 40 (i.e., a workpiece support force). Specifically, the CPU 52 transmits a measurement command to the force sensor 14. When receiving the measurement command from the CPU 52, the force sensor 14 measures the load L applied from the workpiece W to the environment 40. The load L coincides with the workpiece support force.

During the robot 12 lifts the end B of the workpiece W as illustrated in FIG. 1 and transports it, the load L applied from the workpiece W to the environment 40 varies with time. The force sensor 14 measures the load L (i.e., the workpiece support force) at the time point of receiving the measurement command, and transmits measurement data to the I/O interface 58.

The I/O interface 58 acquires the measurement data from the force sensor 14, and the CPU 52 record the measurement data acquired by the I/O interface 58 in the work memory 56. Thus, in this embodiment, the I/O interface 58 functions as a support force data acquisition section configured to acquire the measurement data of the workpiece support force from the force sensor 14.

At step S3, the CPU 52 estimates a disturbance value $D_{T1}$ applied to the robot 12. Specifically, the I/O interface 58 receives feedback information transmitted from each servomotor 38. The CPU 52 records in the work memory 56 the feedback information received by the I/O interface 58 as state information of the robot 12.

The CPU 52 calculates a resultant force of all forces applied to the robot 12 on the basis of the acquired feedback information and a dynamic parameter of the robot 12 (e.g., a position and posture, a mass, a center of mass, an operation speed, and/or an inertia matrix of each component of the robot 12).

On the other hand, the CPU 52 calculates a force (hereinafter, referred to as "internal force") applied to the robot 12 due to the mass of each component of the robot 12, a mass of the other member (e.g., a vision sensor) mounted to the robot 12, and an inertial force caused by the movement of the robot 12. The internal force can be calculated by substituting the dynamic parameter of the robot 12 into a known motion equation.

The CPU 52 estimates the disturbance value $D_{T1}$, which represents an external force applied to the robot 12, by subtracting the internal force from the resultant force obtained from the feedback information received from each servomotor 38. Thus, in this embodiment, the CPU 52 functions as a disturbance estimation section 64 (FIG. 2) configured to estimate the disturbance value $D_{T1}$ applied to the robot 12.

The disturbance value $D_{T1}$ includes a workpiece disturbance value $D_{W1}$, which corresponds to a force applied from the workpiece W to the robot hand 26 due to a gravitational force of the workpiece W, and a contact disturbance value $D_{C1}$, which corresponds to a force applied to the robot 12 from a surrounding object (e.g., an operator or an obstacle) around the robot 12 due to the contact between the object and the robot 12 (or the workpiece W).

At step S4, the CPU 52 corrects the disturbance value $D_{T1}$. Specifically, the CPU 52 subtracts the load L included in the measurement data acquired at step S2 from the gravitational force G applied to the workpiece W, so as to obtain a varying workpiece load $L_W$ (=G−L). The varying workpiece load $L_W$ can be considered as the workpiece disturbance value $D_{W1}$ applied from the workpiece W to the robot hand 26 at the time point when step S2 is started.

Then, the CPU 52 corrects the disturbance value $D_{T1}$ estimated at step S3 by subtracting the varying workpiece load $L_W$ from the disturbance value $D_{T1}$, so as to obtain a corrected disturbance value $E_1$ (=$D_{T1}$−$L_W$). The corrected disturbance value $E_1$ can be considered as the above-mentioned contact disturbance value $D_{T1}$.

Thus, in this embodiment, the CPU 52 functions as a correction section 66 (FIG. 2) configured to correct the disturbance value $D_{T1}$.

At step S5, the CPU 52 determines whether or not the corrected disturbance value $E_1$ is equal to or greater than a predetermined threshold value α (i.e., $|E_1| \geq \alpha$). The threshold value α is predetermined for the corrected disturbance value $E_1$, and stored in the system memory 54.

When the CPU 52 determines that the corrected disturbance value $E_1$ is equal to or greater than the predetermined threshold value α (i.e., determines YES), it proceeds to step S8. On the other hand, when the CPU 52 determines that the corrected disturbance value $E_1$ is less than the predetermined threshold value α (i.e., determines NO), it proceeds to step S6.

At step S6, the CPU 52 determines whether or not the workpiece transportation scheme being carried out at step S1 is appropriately completed. When the CPU 52 determines that the workpiece transportation scheme is appropriately completed (i.e., determines YES), it proceeds to step S7. On the other hand, when the CPU 52 determines that the workpiece transportation scheme is not completed (i.e., determines NO), it returns to step S2.

At step S7, the CPU 52 stops the operation of the robot 12. Specifically, the CPU 52 generates a command for stopping each servomotor 38, and transmits it to each servomotor 38, thereby the robot 12 is stopped. After the execution of step S7, the CPU 52 ends the flow illustrated in FIG. 3.

On the other hand, when the CPU 52 determines YES at step S5, at step S8, the CPU 52 carries out stopping or retracting the robot 12. Specifically, the CPU 52 generates a command for stopping each servomotor 38, and transmits it to each servomotor 38 through the drive section 60, thereby the robot 12 is stopped.

Alternatively, the CPU 52 sends to each servomotor 38 through the drive section 60 a command for moving the component (e.g., the robot arm 22 or the robot hand 26) of the robot 12 in a direction of the corrected disturbance value $E_1$. Thereby, the component of the robot 12 can be retracted in a direction of the force applied to the robot 12 by the contact between the surrounding object and the robot 12.

Thus, in this embodiment, the CPU 52 functions as an operation command section 68 (FIG. 2) configured to generate a command for stopping or retracting the robot 12.

At step S9, the CPU 52 generates an alarm. For example, the CPU 52 generates image or audio data indicating an alarm that "Robot is in contact with surrounding object".

Then, the CPU 52 transmits the generated image or audio data to the display or the speaker via the I/O 58 interface, so as to notify an operator through the display or the speaker.

After step S9, the CPU 52 ends the flow illustrated in FIG. 3. The CPU 52 repeatedly executes steps S2 to S6 with a period T (e.g., one second) until it determines YES at step S5 or S6.

As described above, in this embodiment, the CPU 52 obtains the workpiece disturbance value $D_{W1}$ (i.e., the varying workpiece load $L_W$), which corresponds to the force applied from the workpiece W to the robot hand 26 due to the gravitational force of the workpiece W, on the basis of the load L (the workpiece support force) measured by the force sensor 14.

Then, the CPU 52 corrects the disturbance value $D_{T1}$ so as to eliminate the workpiece disturbance value $D_{W1}$ from the disturbance value $D_{T1}$, thereby obtains the contact disturbance value $D_{C1}$ (i.e., a corrected disturbance value $E_1$). According to this configuration, even when the load L (the workpiece disturbance value $D_{W1}$) by the workpiece W varies with time, it is possible to estimate the contact disturbance value $D_{C1}$ with high accuracy. Accordingly, it is possible to detect the contact between the surrounding object and the robot 12 (or the workpiece W) with high accuracy.

Here, when an external force is applied to the workpiece W from an external object or an operator (for example, when an operator applies an external force to a portion of the workpiece W, which is in contact with the environment 40), the external force may not transmit to the robot hand 26 via the workpiece W.

Such an external force (hereinafter, referred to as "non-transmitted external force") is not included in the disturbance value $D_{T1}$ applied to the robot 12, while included in the load L detected by the force sensor 14.

As described above, in this embodiment, the CPU 52 obtains the varying workpiece load $L_W$ (=G−L), and then obtains the corrected disturbance value $E_1$ (=$D_{T1}$−$L_W$) with using the varying workpiece load, at the above-mentioned step S4.

Accordingly, since a component of the non-transmitted external force is included in the corrected disturbance value $E_1$, it is possible to consequently detect such non-transmitted external force by carrying out step S5 even if the non-transmitted external force is applied to the workpiece W at step S1. Thus, according to this embodiment, it is possible to detect not only the contact disturbance value $D_{C1}$ applied to the robot 12 but also the non-transmitted external force.

Next, another example of the operation of the robot system 10 will be described with reference to FIG. 4. Note that, in the flow illustrated in FIG. 4, processes similar to those in FIG. 3 are assigned the same step numbers, and detailed description thereof will be omitted.

Figure 4:
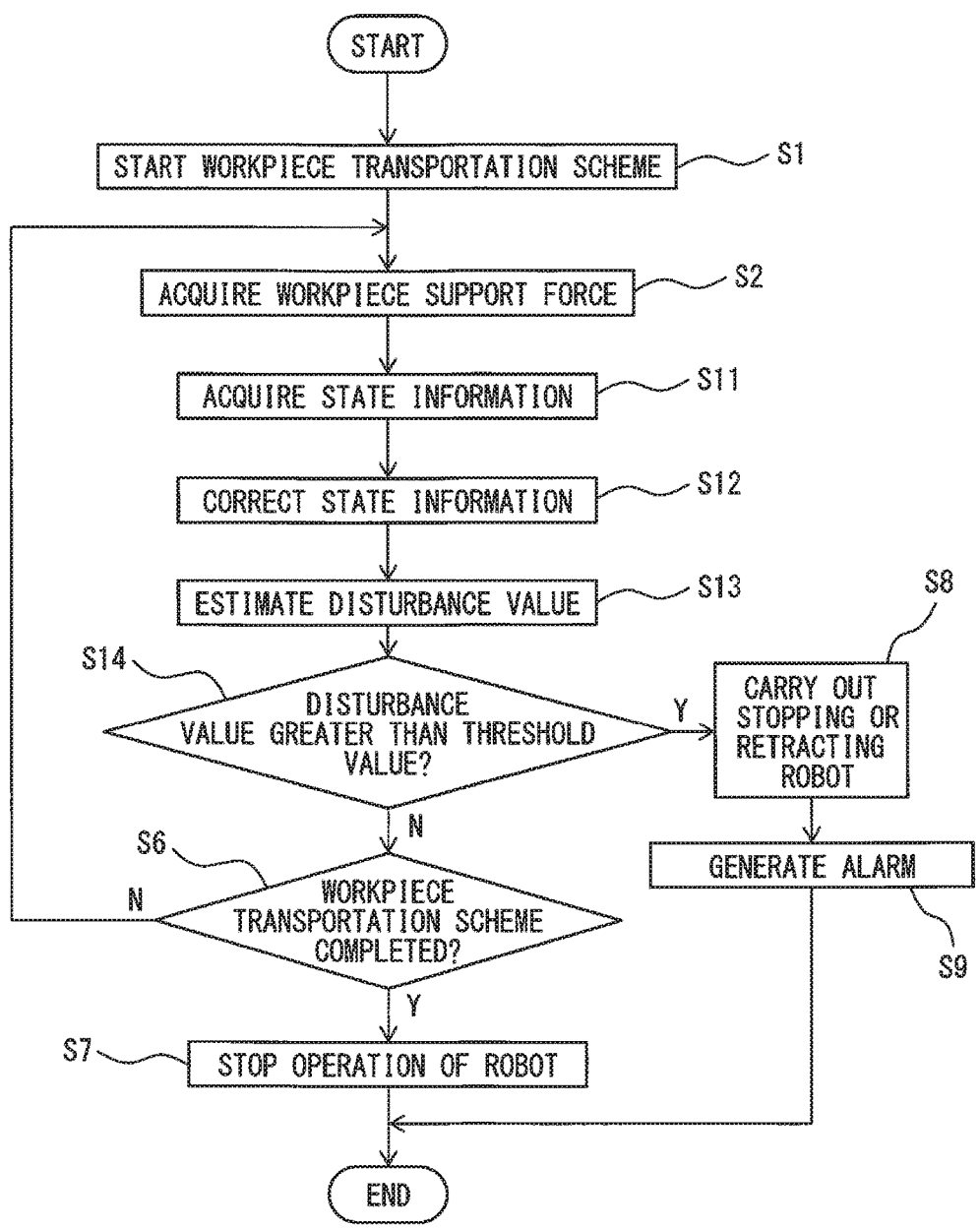
FIG. 4 is a flowchart illustrating another example of the operation flow of the robot system as illustrated in FIG. 1.

After the flow illustrated in FIG. 4 is started, the CPU 52 sequentially executes steps 1 and 2, similarly to the flow illustrated in FIG. 3.

After step S2, at step S11, the CPU 52 acquires the state information of the robot 12. Specifically, the CPU 52 acquires the feedback information from each servomotor 38 through the I/O interface 58, and records the feedback information in the work memory 56 as the state information of the robot 12.

At step S12, the CPU 52 corrects the state information. Specifically, the CPU 52 calculates the above-mentioned varying workpiece load $L_W$ (=G−L). Then, the CPU 52 corrects the state information based on a state change of the robot 12 due to the varying workpiece load $L_W$.

When the varying workpiece load $L_W$ (i.e., the workpiece disturbance value) is applied to the robot hand 26, the state (a load torque applied to each component, or a position and posture of each component) of each component (the rotary barrel 20, the robot arm 22, the wrist 24, and the robot hand 26) of the robot 12 changes.

By this state change, a disturbance torque is applied to each servomotor 38 incorporated in the robot 12, and the rotation speed of each servomotor 38 changes. Such a disturbance torque or an amount of change in the rotation speed can be calculated from the varying workpiece load $L_W$.

Accordingly, the CPU 52 corrects the feedback information by eliminating a component due to the varying workpiece load $L_W$ from the feedback information of the servomotors 38 acquired at step S11.

For example, the CPU 52 subtracts the disturbance torque from the load torque included in the feedback information, or subtracts the amount of change in the rotation speed due to the varying workpiece load $L_W$ from the rotation speed included in the feedback information. Thus, the CPU 52 functions as a correction section 66 (FIG. 1) configured to correct the state information of the robot 12.

At step S13, the CPU 52 estimates the disturbance value $E_1$. Specifically, the CPU 52 calculates a resultant force of the forces applied to the robot 12 from the feedback information corrected at step S12.

Thus-calculated resultant force is a resultant force of the internal force acted on the robot 12 and the force applied from the surrounding object to the robot 12 by contact between the surrounding object and the robot 12 (or the workpiece W), while does not include the force applied from the workpiece W to the robot hand 26 due to the gravitational force of the workpiece W. Then, the CPU 52 subtracts the internal force from the calculated resultant force, thereby estimate the disturbance value $E_1$ applied to the robot 12.

Thus-estimated disturbance value $E_1$ does not include the workpiece disturbance value $D_{W1}$, and therefore is a value coinciding with the contact disturbance value $D_{C1}$. Thus, in this embodiment, the CPU 52 functions as the disturbance estimation section 64 (FIG. 2) configured to estimate the disturbance value $E_1$ applied to the robot 12.

At step S14, the CPU 52 determines whether or not the disturbance value $E_1$ estimated at step S13 is equal to or greater than the predetermined threshold value α (i.e., $|E_1| \geq \alpha$). The threshold value α is predetermined for the disturbance value $E_1$, and stored in the system memory 54.

When the CPU 52 determines that the disturbance value $E_1$ is equal to or greater than the predetermined threshold value α (i.e., determines YES), it proceeds to step S8. On the other hand, when the CPU 52 determines that the corrected disturbance value $E_1$ is less than the predetermined threshold value α (i.e., determines NO), it proceeds to step S6.

After step S14, the CPU 52 sequentially executes steps S6 and S7, or steps S8 and S9, similarly to the flow illustrated in FIG. 3.

As described above, in this embodiment, the CPU 52 corrects the feedback information of the servomotors 38 by eliminating a component of the workpiece disturbance value $D_{W1}$ therefrom, and estimates the disturbance value $E_1$, which coincides with the contact disturbance value $D_{C1}$, based on the corrected feedback information.

According to this configuration, even when the load L (the workpiece disturbance value $D_W$) by the workpiece W varies with time, it is possible to estimate the contact disturbance value $D_{C1}$ with high accuracy. Accordingly, it is possible to detect the contact between the surrounding object and the robot 12 (or the workpiece W) with high accuracy. Further, not only the contact disturbance value $D_{C1}$ applied to the robot 12 but also the non-transmitted external force described above can be detected.

Next, a robot system 70 according to another embodiment will be described with reference to FIGS. 5 and 6. The robot system 70 includes the robot 12, the first force sensor 14, a second force sensor 72, and a robot control device 80.

The second force sensor 72 is provided at the robot base 18. The second force sensor 72 is comprised of e.g. a 6-axis force sensor including a plurality of strain gauges, and transmits to the robot control device 80 an output signal in response to strain generated at the second force sensor 72.

Figure 6:
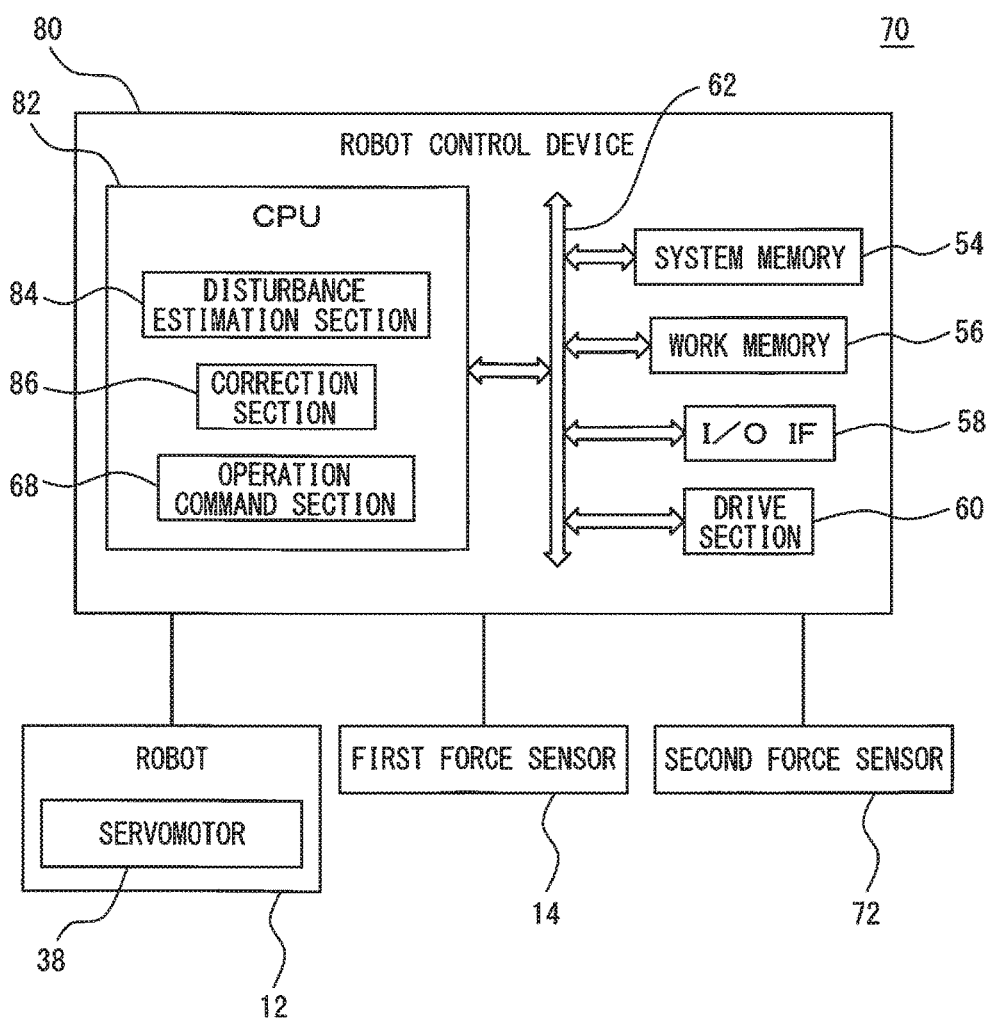
FIG. 6 is a block diagram of the robot system as illustrated in FIG. 5.

As illustrated in FIG. 6, the robot control device 80 includes a CPU 82, the system memory 54, the work memory 56, the I/O interface 58, and the drive section 60. The I/O interface 58 is communicably connected to the second force sensor 72, and receives the output signal from the second force sensor 72 in accordance with a command from the CPU 82.

Next, an example of an operation of the robot system 70 will be described with reference to FIG. 3. At step S1, the CPU 82 carries out the workpiece transportation scheme, similarly to the s embodiment.

At step S2, the CPU 82 acquires the workpiece support force, similarly to the above-mentioned embodiments. Specifically, the CPU 82 transmits the measurement command to the first force sensor 14. When receiving the measurement command from the CPU 82, the first force sensor 14 measures the load L applied from the workpiece W to the environment 40. The load L coincides with the workpiece support force.

The first force sensor 14 measures the load L (i.e., the workpiece support force) at the time of receiving the measurement command, and transmits the measurement data to the I/O interface 58. The I/O interface 58 functions as the support force data acquisition section, and acquires the measurement data from the first force sensor 14. The CPU 82 records the measurement data acquired by the I/O interface 58 in the work memory 56.

At step S3, the CPU 82 estimates a disturbance value $D_{T2}$ applied to the robot 12. Specifically, the CPU 82 receives an output signal from the second force sensor 72 via the I/O interface 58.

The CPU 82 filters the output signal received from the second force sensor 72 so as to eliminate a noise component from the output signal. For example, the CPU 82 eliminates the noise component from the output signal by carrying out known signal processing, such as a low pass filtering, an arithmetic mean, a weighted mean, a finite impulse response (FIR) filtering, or an infinite impulse response (IIR) filtering, to the output signal from the second force sensor 72.

Figure 5:
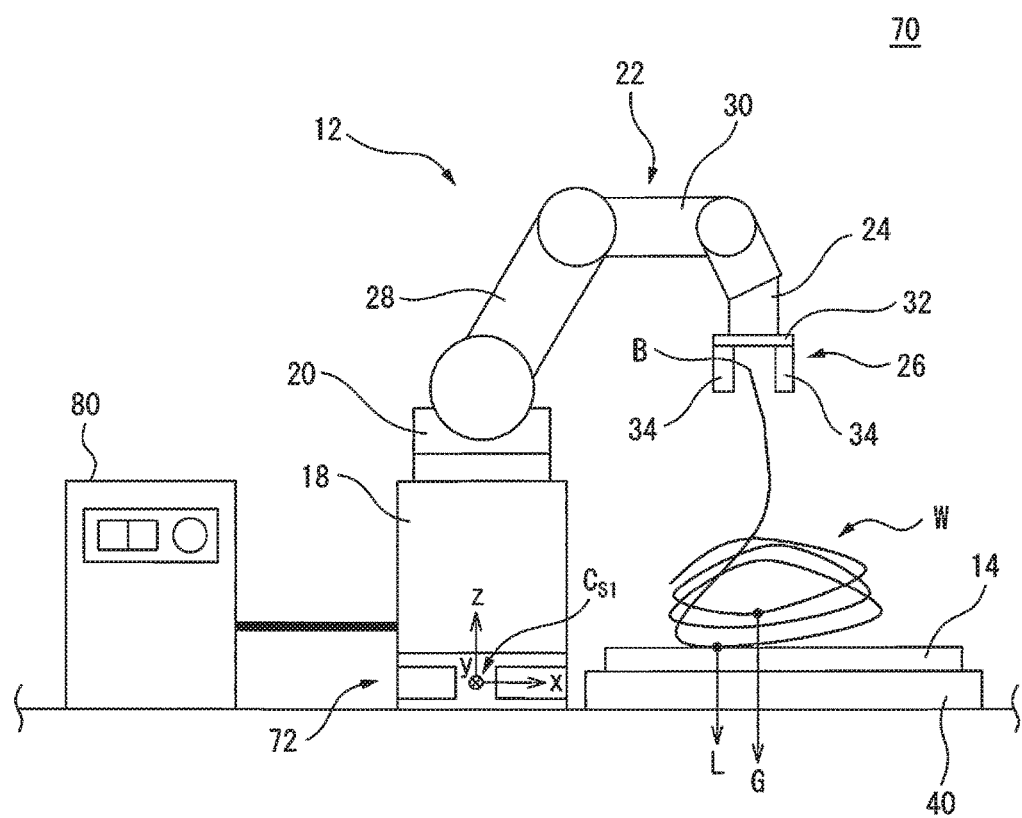
FIG. 5 is a diagram of a robot system according to another embodiment.

On the other hand, the CPU 82 sets a sensor coordinate system $C_{S1}$ for the second force sensor 72, as illustrated by an orthogonal coordinate system in FIG. 5. From the output signal received from the second force sensor 72, the CPU 82 respectively calculates forces $F_T$ in x-axis, y-axis, and z-axis directions of the sensor coordinate system $C_{S1}$, and moments $M_T$ about x-axis, y-axis, and z-axis directions of the sensor coordinate system $C_{S1}$.

With sing the forces $F_T$ and the moments $M_T$, the CPU 82 detects a resultant force of all forces applied to the robot 12 (i.e., the robot base 18, the rotary barrel 20, the robot arm 22, the wrist 24, and the robot hand 26) as a force applied to the second force sensor 72.

On the other hand, the CPU 82 calculates the internal force applied to the second force sensor 72. The internal force can be calculated by substituting a mass of each component of the robot 12, a posture of the robot 12, and an operation speed of each component of the robot 12 into a known motion equation.

Then, the CPU 82 subtracts the internal force from the obtained resultant force, thereby estimates the disturbance value $D_{T2}$ applied to the second force sensor 72 due to an external force applied to a part (the robot base 18, the rotary barrel 20, the robot arm 22, the wrist 24, and the robot hand 26) of the robot 12.

Thus, in this embodiment, the CPU 82 estimates the disturbance value $D_{T2}$ with using the forces $F_T$ and the moments $M_T$ obtained from the output signal from the second force sensor 72. Therefore, the output signal from the second force sensor 72 and the forces $F_T$ and the moments $M_T$ obtained from the output signal constitute the state information of the robot 12.

The disturbance value $D_{T2}$ includes a workpiece disturbance value $D_{W2}$ and a contact disturbance value $D_{C2}$. The workpiece disturbance value $D_{W2}$ corresponds to a force caused by that the varying workpiece load $L_W$ applied to the robot hand 26 transmits through the wrist 24, the robot arm 22, the rotary barrel 20 and the robot base 18 to the second force sensor 72 so as to be acted on the second force sensor 72.

The contact disturbance value $D_{C2}$ corresponds to a force acted on the second force sensor 72 due to a force applied from the surrounding object to the robot 12 by the contact between the object and the robot 12 (or the workpiece W). Thus, in this embodiment, the CPU 82 functions as a disturbance estimation section 84 (FIG. 2) configured to estimate the disturbance value $D_{T2}$ applied to the robot 12.

At step S4, the CPU 82 corrects the disturbance value $D_{T2}$. Specifically, the CPU 82 calculates the varying workpiece load $L_W$ (=G−L), similarly to the above-mentioned embodiments. Then, the CPU 82 multiplies the varying workpiece load $L_W$ by a force conversion matrix J, thereby calculates the workpiece disturbance value $D_{W2}$ (=J*$L_W$).

The force conversion matrix J is a matrix (specifically, a Jacobian matrix) for converting the varying workpiece load $L_W$ applied to the robot hand 26 to a force acted on the second force sensor 72.

Then, the CPU 82 corrects the disturbance value $D_{T2}$ by subtracting the calculated workpiece disturbance value $D_{W2}$ from the disturbance value $D_{T2}$ estimated at step S3, so as to obtain a corrected disturbance value $E_2$ (=$D_{T2}$−$D_{W2}$=$D_{T2}$−J*$L_W$). The corrected disturbance value $E_2$ can be considered as the contact disturbance value $D_{C2}$. Thus, in this embodiment, the CPU 82 functions as a correction section 86 (FIG. 2) configured to correct the disturbance value $D_{T2}$.

At step S5, the CPU 82 determines whether or not the corrected disturbance value $E_2$ is equal to or greater than a predetermined threshold value β (i.e., ↑$E_2$≥β). The threshold value β is predetermined for the corrected disturbance value $E_2$, and stored in the system memory 54.

When the CPU 82 determines that the corrected disturbance value $E_2$ is equal to or greater than the predetermined threshold value β (i.e., determines YES), it proceeds to step S8. On the other hand, when the CPU 82 determines that the corrected disturbance value $E_2$ is less than the predetermined threshold value β (i.e., determines NO), it proceeds to step S6.

After step S5, the CPU 82 sequentially executes steps S6 and S7 or steps S8 and S9, similarly to the above-mentioned embodiments. In this way, the CPU 82 repeatedly executes steps S2 to S6 with a period T (e.g., one second) until it determines YES at step S5 or step S6.

As described above, in this embodiment, the CPU 82 obtains the varying workpiece load $L_W$ from the load L (the workpiece support force) measured by the first force sensor 14, and obtains the workpiece disturbance value $D_{W2}$ from the varying workpiece load $L_W$. Then, the CPU 82 corrects the disturbance value $D_T$ by eliminating the workpiece disturbance value $D_{W2}$ therefrom, so as to obtain the corrected disturbance value $E_2$ coinciding with the contact disturbance value $D_{C2}$.

According to this configuration, it is possible to estimate the contact disturbance value $D_{C2}$ with high accuracy even when the load L (the workpiece disturbance value $D_W$) by the workpiece W varies with time. Accordingly, it is possible to detect the contact between the surrounding object and the robot 12 (or the workpiece W) with high accuracy. Further, not only the contact disturbance value $D_{C2}$ applied to the robot 12 but also the above-mentioned non-transmitted external force can be detected.

Next, another example of the operation of the robot system 70 will be described with reference to FIG. 4. After the flow illustrated in FIG. 4 is started, the CPU 82 sequentially executes steps S1 and S2, similarly to the flow illustrated in FIG. 3.

After step S2, at step S11, the CPU 82 acquires the state information of the robot 12. As an example, the CPU 82 acquires an output signal (a signal in response to a strain) from the second force sensor 72 via the I/O interface 58, and records it in the work memory 56 as the state information of the robot 12.

As another example, the CPU 82 calculates the forces $F_T$ in x-axis, y-axis, and z-axis directions of the sensor coordinate system $C_{S1}$ and the moments $M_T$ about the x-axis, y-axis, and z-axis directions of the sensor coordinate system $C_{S1}$, based on an output signal from the second force sensor 72, and records them in the work memory 56 as the state information of the robot 12.

At step S12, the CPU 82 corrects the state information. Specifically, the CPU 82 calculates the above-mentioned varying workpiece load $L_W$ (=G−L). Then, the CPU 82 corrects the state information on the basis of a state change of the robot 12 due to the varying workpiece load $L_W$.

When the varying workpiece load $L_W$ is applied to the robot hand 26, a state (the position and posture) of each component (i.e., the rotary barrel 20, the robot arm 22, the wrist 24, and the robot hand 26) of the robot 12 changes.

The varying workpiece load $L_W$ applied to the robot hand 26 transmits through the wrist 24, the robot arm 22, the rotary barrel 20, and the robot base 18 so as to be acted on the second force sensor 72.

As a result, a component of the varying workpiece load $L_W$ is included in the state information (i.e., the output signal of the second force sensor 72, or the forces $F_T$ and the moments $M_T$) obtained by the second force sensor 72.

At this step S12, the CPU 82 corrects the state information so as to eliminate the component of the varying workpiece load $L_W$ from the state information.

As an example, the CPU 82 subtracts the component of the varying workpiece load $L_W$ from the output signal received from the second force sensor 72, so as to obtain a signal-correction value $H_1$. The component of the varying workpiece load $L_W$ included in the output signal from the second force sensor 72 can be obtained from the varying workpiece load $L_W$ and a known theoretical formula.

As another example, the CPU 82 respectively calculates load-originated forces $F_L$ acted in x-axis, y-axis, and z-axis directions of the sensor coordinate system $C_{S1}$ and load-originated moments $M_L$ acted about x-axis, y-axis, and z-axis directions of the sensor coordinate system $C_{S1}$ due to the varying workpiece load $L_W$.

Then, the CPU 82 subtracts the load-originated forces $F_L$ and the load-originated moments $M_L$ respectively from the forces $F_T$ and the moments $M_T$ as the state information, so as to obtain a force-correction value $H_2$ and a moment-correction value $H_3$.

Thus, the CPU 82 functions as the correction section 86 (FIG. 6) configured to correct the state information (the output signal of the second force sensor 72, or the forces $F_T$ and the moments $M_T$) of the robot 12.

At step S13, the CPU 82 estimates the disturbance value $E_2$. Specifically, the CPU 82 calculates a resultant force of forces applied to the robot 12 as a force acted on the second force sensor 72, with using the signal-correction value $H_1$ or the force-correction value $H_2$ and the moment-correction value $H_3$ acquired at step S12.

The resultant force is a resultant force of the internal force applied to the second force sensor 72 and the force applied to the second force sensor 72 due to the contact between the surrounding object and the robot 12 (or the workpiece W), and does not include the force applied to the second force sensor 72 due to the gravitational force of the workpiece W.

The CPU 82 estimates the disturbance value $E_2$ applied to the second force sensor 72 by subtracting the internal force from the calculated resultant force. This disturbance value $E_2$ does not include the workpiece disturbance value $D_{W2}$, and therefore can be considered as the contact disturbance value $D_{C2}$.

After step S13, the CPU 82 executes step S14, and then sequentially executes steps S6 and S7 or steps S8 and S9, similarly to the flow illustrated in FIG. 3.

As described above, in this embodiment, the CPU 82 corrects the state information (the output signal from the second force sensor 72 or the forces $F_T$ and the moments $M_T$) of the robot 12 so as to eliminate the component of the workpiece disturbance value $D_{W2}$ therefrom, and estimates the disturbance value $E_2$ coinciding with the contact disturbance value $D_{C2}$ on the basis of the corrected state information.

According to this configuration, it is possible to estimate the contact disturbance value $D_{C2}$ with high accuracy, even when the load L (the workpiece disturbance value $D_W$) by the workpiece W varies with time. Accordingly, it is possible to detect the contact between the surrounding object and the robot 12 (or the workpiece W) with high accuracy. Further, not only the contact disturbance value $D_{C2}$ applied to the robot 12 but also the above-mentioned non-transmitted external force can be detected.

Next, a robot system 90 according to still another embodiment will be described with reference to FIGS. 7 and 8. The robot system 90 includes the robot 12, the first force sensor 14, a second force sensor 92, and a robot control device 100.

The second force sensor 92 is provided at the finger 34 of the robot hand 26. The second force sensor 92 is comprised of e.g. a 6-axis force sensor including a plurality of strain gauges. The second force sensor 92 receives a force applied to the finger 34, and transmits to the robot control device 100 an output signal in response to a strain generated at the second force sensor 92 by the force.

The robot control device 100 includes a CPU 102, the system memory 54, the work memory 56, the I/O interface 58, and the drive section 60. The I/O interface 58 is communicably connected to the second force sensor 92, and receives the output signal from the second force sensor 92 in accordance with a command from the CPU 102.

Figure 7:
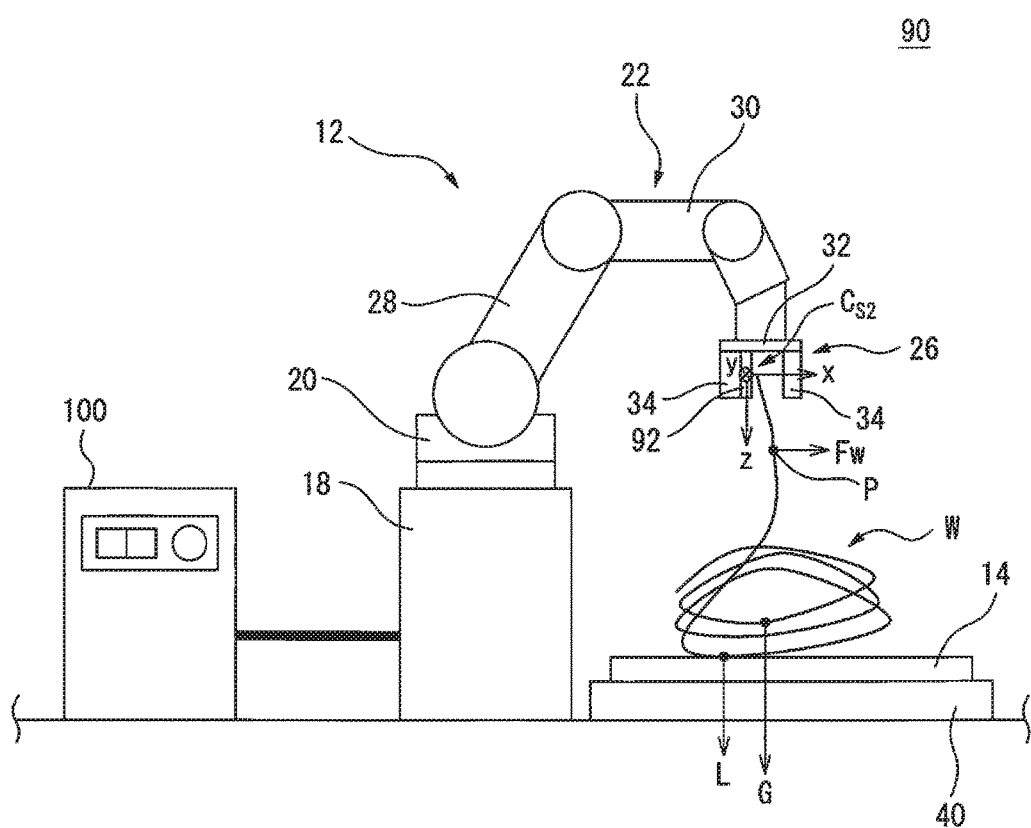
FIG. 7 is a diagram of a robot system according to still another embodiment.
Figure 8:
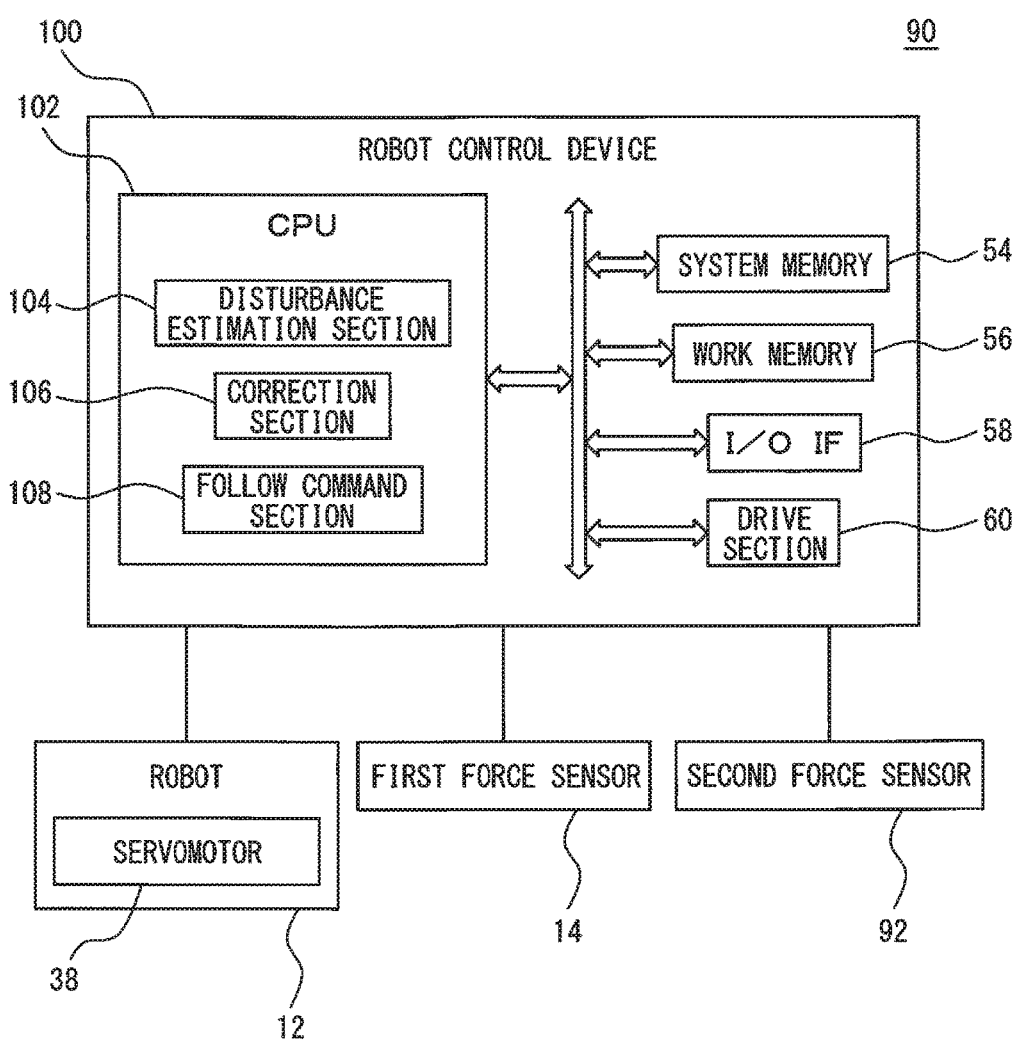
FIG. 8 is a block diagram of the robot system as illustrated in FIG. 7.

As illustrated by an orthogonal coordinate system in FIG. 7, the CPU 102 sets a sensor coordinate system $C_{S2}$ for the second force sensor 92. A position (an origin position) and posture (x-axis, y-axis, and z-axis directions) of the sensor coordinate system $C_{S2}$ changes with a position and posture of the robot hand 26. Accordingly, the CPU 102 updates the position and posture of the sensor coordinate system $C_{S2}$ each time the CPU 102 changes the position and posture of the robot hand 26 while executing step S1.

On the basis of the output signal received from the second force sensor 92, the CPU 102 calculates forces in x-axis, y-axis, and z-axis directions of the sensor coordinate system $C_{S2}$ and moments about x-axis, y-axis, and z-axis directions of the sensor coordinate system $C_{S2}$.

Figure 9:
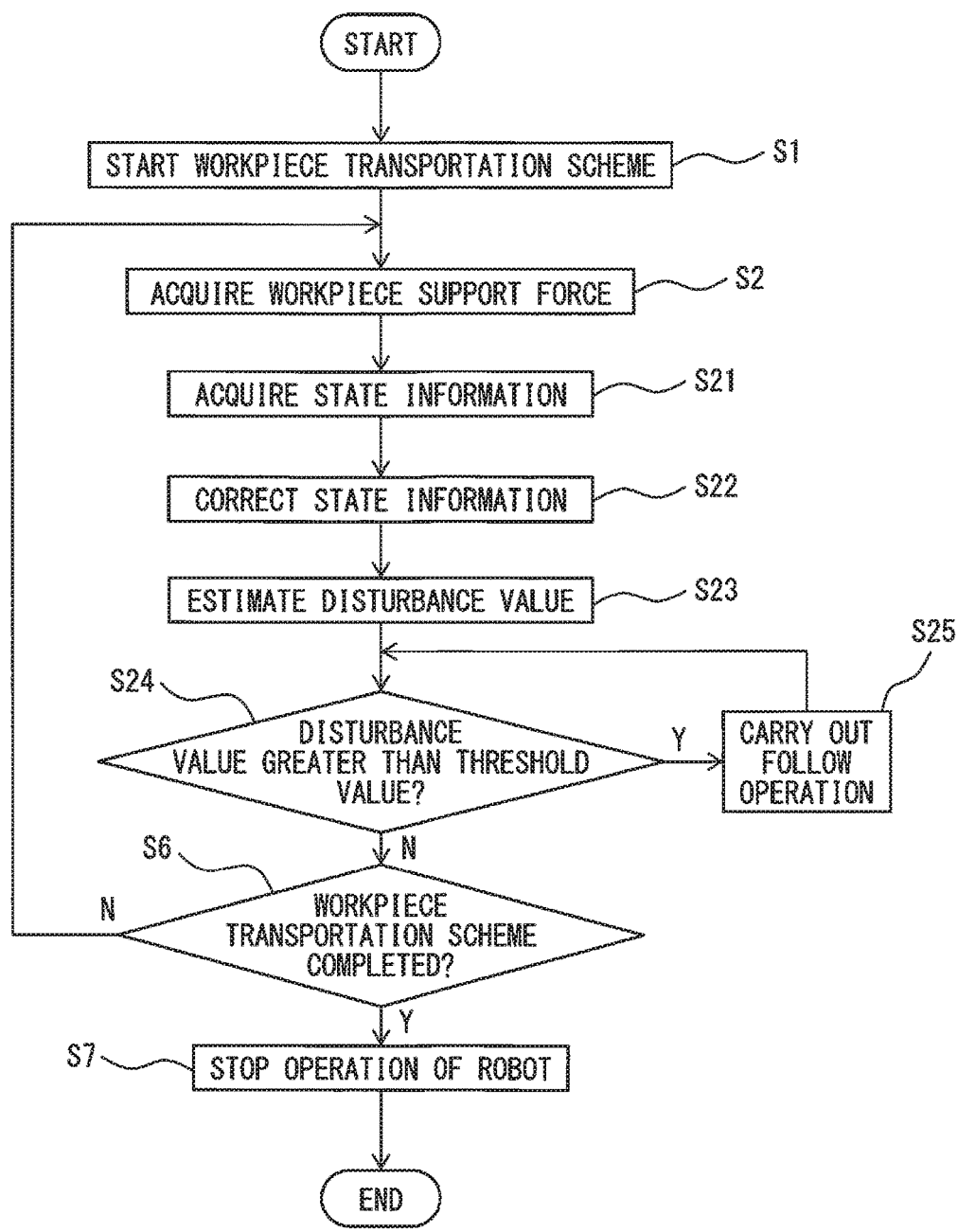
FIG. 9 is a flowchart illustrating an example of an operation flow of the robot system as illustrated in FIG. 7.

Next, an example of an operation of the robot system 90 will be described with reference to FIG. 9. After the flow illustrated in FIG. 9 is started, the CPU 102 sequentially executes steps S1 and S2 similarly to the embodiments described above.

After step S2, at step S21, the CPU 102 acquires the state information of the robot 12. As an example, the CPU 102 acquires an output signal from the second force sensor 92 via the I/O interface 58, and records it in the work memory 56 as the state information of the robot 12.

As another example, the CPU 102 calculates forces $F_{T2}$ in x-axis, y-axis, and z-axis directions of the sensor coordinate system $C_{S2}$ and moments $M_{T2}$ about x-axis, y-axis, and z-axis directions of the sensor coordinate system $C_{S2}$ based on the output signal from the second force sensor 92, and records them in the work memory 56 as the state information of the robot 12.

At step S22, the CPU 102 corrects the state information. Specifically, the CPU 102 calculates the above-mentioned varying workpiece load $L_W$ (=G−L). Then, the CPU 102 corrects the state information on the basis of a state change of the robot 12 due to the varying workpiece load $L_W$.

When the varying workpiece load $L_W$ is applied to the robot hand 26, a state (e.g., a position of the fingers 34) of the robot hand 26 changes, as a result of which, a component of the varying workpiece load $L_W$ is included in the state information (i.e., the output signal of the second force sensor 92, or the forces $F_{T2}$ and the moments $M_{T2}$) obtained by the second force sensor 92.

At this step S22, the CPU 102 corrects the state information so as to eliminate the component of the varying workpiece load $L_W$ from the state information.

As an example, the CPU 102 subtracts the component of the varying workpiece load $L_W$ from the output signal received from the second force sensor 92 so as to obtain a signal-correction value $H_4$. The component of the varying workpiece load $L_W$ included in the output signal from the second force sensor 92 can be obtained from the varying workpiece load $L_W$ and a known theoretical formula.

As another example, the CPU 102 respectively calculates load-originated forces $F_{L2}$ acted in x-axis, y-axis, and z-axis directions of the sensor coordinate system $C_{S2}$ and load-originated moments $M_{L2}$ acted about x-axis, y-axis, and z-axis directions of the sensor coordinate system $C_{S2}$, due to the varying workpiece load $L_W$.

Then, the CPU 102 subtracts the load-originated forces $F_{L2}$ and the load-originated moments $M_{L2}$ respectively from the forces $F_{T2}$ and the moments $M_{T2}$ as the state information, so as to obtain a force-correction value $H_5$ and a moment-correction value $H_6$.

For example, if the sensor coordinate system $C_{S2}$ is set such that z-axis positive direction of the sensor coordinate system $C_{S2}$ coincides with the vertically downward direction as illustrated in FIG. 7, the load-originated force $F_{L2}$ in the z-axis direction coincides with the varying workpiece load $L_W$. Accordingly, in such a case, the force-correction value $H_5$ in the z-axis direction is a value obtained by subtracting the varying workpiece load $L_W$ from the load-originated force $F_{T2}$ in the z-axis direction obtained at step S21.

Thus, the CPU 102 functions as a correction section 106 (FIG. 8) configured to correct the state information (the output signal of the second force sensor 92, or the forces $F_{T2}$ and the moments $M_{T2}$) of the robot 12.

At step S23, the CPU 102 estimates a disturbance value $E_3$. Specifically, the CPU 102 estimates a force (i.e., the disturbance value $E_3$) applied to the second force sensor 92 with using the signal-correction value $H_4$ or the force-correction value $H_5$ and the moment-correction value $H_6$ acquired at step S12.

The disturbance value $E_3$ does not include a workpiece disturbance value applied to the second force sensor 92 due to the gravitational force of the workpiece W, and can be considered as a contact disturbance value applied to the second force sensor 92 due to the contact between the surrounding object (e.g., an operator) and the workpiece W. Thus, in this embodiment, the CPU 102 functions as a disturbance estimation section 104 (FIG. 8) configured to estimate the disturbance value $E_3$.

At step S24, the CPU 102 determines whether or not the disturbance value $E_3$ estimated at step S23 is equal to or greater than a predetermined threshold value γ (i.e., $|E_3| \geq \gamma$). The threshold value γ is predetermined for the disturbance value $E_3$ and stored in the system memory 54.

When the CPU 102 determines that the disturbance value $E_3$ is equal to or greater than the predetermined threshold value γ (i.e., determines YES), it proceeds to step S25. On the other hand, when the CPU 102 determines that the disturbance value $E_3$ is less than the predetermined threshold value γ (i.e., determines NO), it proceeds to step S6. After determining YES at step S24, the CPU 102 sequentially executes steps S6 and S7 similarly to the flow illustrated in FIG. 3.

On the other hand, when determining YES at step S24, the CPU 102 executes a follow operation at step S25. Herein, a case is assumed where an operator holds a part P (FIG. 7) of the workpiece W and draws the part P with a force $F_W$. In this case, the disturbance value $E_3$ estimated at most-recent step S23 substantially coincides with the force $F_W$.

In this embodiment, the CPU 102 generates a follow operation command for operating the robot 12 in accordance with forces in x-axis, y-axis, and z-axis directions of the sensor coordinate system $C_{S2}$ and moments about x-axis, y-axis, and z-axis directions of the sensor coordinate system $C_{S2}$, which constitute the disturbance value $E_3$ (i.e., the force $F_W$) estimated at most-recent step S23.

Then, the CPU 102 transmits the generated follow operation command to each servomotor 38 so as to move the robot hand 26 in the direction of the disturbance value $E_3$. As a result, the robot 12 operates so as to follow the force $F_W$ applied by an operator to the workpiece W.

Thus, in this embodiment, the CPU 102 functions as a follow command section 108 (FIG. 8) configured to generate the command for operating the robot 12 in accordance with the disturbance value $E_3$. After the execution of step S25, the CPU 102 returns to step S24.

As described above, in this embodiment, the CPU 102 corrects the state information (the output signal from the second force sensor 92, or the forces $F_{T2}$ and the moments $M_{T2}$) of the robot 12 so as to eliminate the component of the workpiece disturbance value therefrom, and estimates the disturbance value $E_3$ coinciding with the contact disturbance value on the basis of the corrected state information.

According to this configuration, it is possible to estimate the contact disturbance value with high accuracy even when the load L (the workpiece disturbance value $D_W$) by the workpiece W varies with time. Accordingly, it is possible to detect the contact between the surrounding object and the workpiece W with high accuracy.

Further, in this embodiment, when the CPU 102 determines YES at step S24, the CPU 102 executes the follow operation in accordance with the disturbance value $E_3$ corresponding to an external force applied to the workpiece W.

According to this configuration, an operator can move the component (e.g., the robot hand 26) of the robot 12 in a desired direction (so-called, a hand guiding operation) by drawing the part P of the workpiece W with the force $F_W$.

Note that, in the embodiments described above, the force sensor (the first force sensor) 14 detects a force in the vertically downward direction. However, the force sensor 14 may be capable of detecting forces in a plurality of directions.

Figure 10:
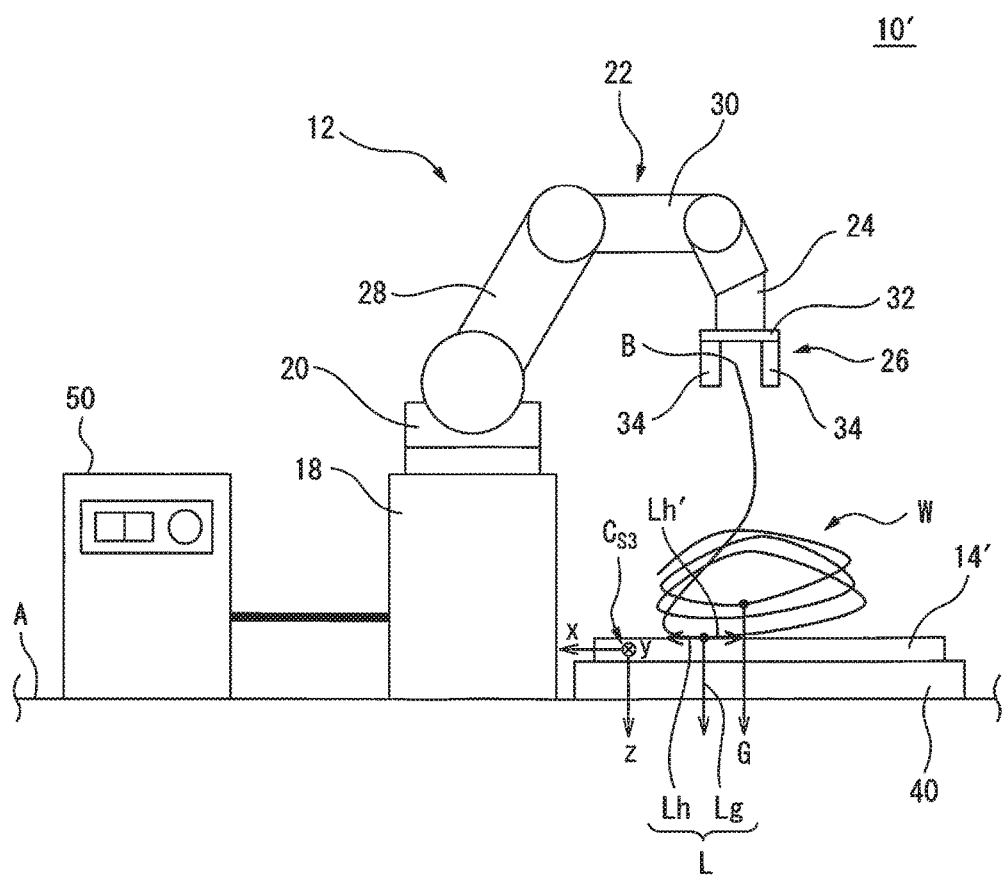
FIG. 10 is a diagram of a robot system according to still another embodiment.

Such an embodiment will be described with reference to FIG. 10. A robot system 10' illustrated in FIG. 10 is a modification of the above-mentioned robot system 10, and differs from the robot system 10 in that the robot system 10' includes a force sensor 14'.

The force sensor 14' is comprised of e.g. a force sensor including a plurality of strain gauges, and can detect forces in x-axis, y-axis, and z-axis directions of a sensor coordinate system $C_{S3}$. In this embodiment, the sensor coordinate system $C_{S3}$ is set such that the x-axis and y-axis of the sensor coordinate system $C_{S3}$ are parallel to a horizontal plane, and the z-axis positive direction coincides with the vertically downward direction.

Herein, a case is assumed where the robot 12 holds the workpiece W and moves it in the horizontal direction. In this case, the workpiece W is moved to slide on the environment 40, whereby the load L applied from the workpiece W to the environment 40 includes a load component $L_g$ in the gravitational direction and a load component $L_h$ in the horizontal direction.

The load component $L_h$ in the horizontal direction is a force corresponding to a friction force depending on the gravitational force G of the workpiece W. The force sensor 14' can detect the load component $L_g$ and the load component $L_h$.

Next, an operation of the robot system 10' will be described with reference to FIG. 3. After the flow illustrated in FIG. 3 is started, the CPU 52 of the robot system 10' executes step S1 similarly to the embodiments described above.

At step S2, the CPU 52 acquires a force with which the workpiece W is supported by the environment 40 (i.e., the workpiece support force). Specifically, the CPU 52 transmits a measurement command to the force sensor 14'.

When receiving the measurement command from the CPU 52, the force sensor 14' measures the load components $L_g$ and $L_h$ of the load L applied from the workpiece W to the environment 40. The load L including the load components $L_g$ and $L_h$ coincides with the above-mentioned workpiece support force.

The force sensor 14' measures the load components $L_g$ and $L_h$ of the load L at the time of receiving the measurement command, and transmits measurement data to the I/O interface 58. The CPU 52 records the measurement data acquired through the I/O interface 58 in the work memory 56.

At step S3, the CPU 52 estimates the disturbance value $D_{T1}$ on the basis of the feedback information from each servomotor 38, similarly to the embodiments described above.

At step S4, the CPU 52 corrects the disturbance value $D_{T1}$ estimated at step S3. Specifically, the CPU 52 subtracts the load component $L_g$ of the load L acquired at step S2 from the gravitational force G acted on the workpiece W, so as to obtain a varying workpiece load component $L_{Wg}$ (=G−$L_g$).

Then, the CPU 52 adds to the calculated varying workpiece load component $L_{Wg}$ a force component $L_h'$ (FIG. 10) obtained by inverting the direction of the load component $L_h$ of the load L acquired at step S2, and calculates a varying workpiece load component $L_{W2}$ (=$L_{Wg}$+$L_H'$).

Thus-calculated varying workpiece load component $L_{W2}$ can be considered as a workpiece disturbance value $D_{W1}'$ corresponding to a force applied from the workpiece W to the robot hand 26 due to the gravitational force of the workpiece W at the start of step S2.

Then, the CPU 52 corrects the disturbance value $D_{T1}$ estimated at step S3 by subtracting the varying workpiece load $L_{W2}$ from the disturbance value $D_{T1}$, so as to obtain a corrected disturbance value $E_4$ (=$D_{T1}$−$L_{W2}$). The corrected disturbance value $E_4$ can be considered as the contact disturbance value $D_{C1}$.

At step S5, the CPU 52 determines whether or not the corrected disturbance value $E_4$ is equal to or greater than a predetermined threshold value δ (i.e., $E_4 \geq \delta$). The threshold value δ is predetermined for the corrected disturbance value $E_4$ and stored in the system memory 54.

When the CPU 52 determines that the corrected disturbance value $E_4$ is equal to or greater than the predetermined threshold value δ (i.e., determines YES), it proceeds to step S8. On the other hand, when the CPU 52 determines that the corrected disturbance value $E_4$ is less than the predetermined threshold value δ (i.e., determines NO), it proceeds to step S6.

After step S5, the CPU 52 executes steps S6 and S7 or steps S8 and S9, similarly to the embodiments described above.

According to this embodiment, the contact disturbance value $D_{C1}$ can be estimated more accurately in consideration of a friction force generated by the workpiece W sliding on the environment 40.

Note that, it is obvious to a person skilled in the art that the force sensor 14' can be employed in place of the first force sensor 14 in the robot system 70 or 90. In this case, the CPU 52, 82 or 102 executes the flow illustrated in FIG. 2 or 3 in which the varying workpiece load $L_{W2}$=$L_{Wg}$+$L_H'$.

Note that, the feedback information from the servomotors 38 is not limited to the load torque or the rotation speed as described above, but any information, which is an output of a detection device capable of obtaining information enabling estimation of a disturbance value, may be used.

Further, a force applied to the robot 12, which is to be obtained from the force $F_T$ ($F_{T2}$) and the moment $M_T$ ($M_{T2}$) measured by the second force sensor 72 (92), may be used as the above-mentioned state information.

Further, an upper surface of the environment 40 on which the workpiece W is placed may be an inclined plane inclined with respect to the horizontal direction, or may be a vertical plane parallel to the vertical direction. In this case, the force sensor 14, 14' may be configured to have a box-shape, and measure a load applied from the workpiece W to the environment 40.

While the invention has been described in terms of embodiments of the invention, the embodiments as described above do not limit the invention as recited in the claims. In addition, although a mode in which the features described in the embodiments of the invention are combined can be also included in the technical scope of the invention, all the combinations of these features are not always essential for solution means of the invention. Further, it is also apparent for those skilled in the art that various modifications or improvements can be added to the above embodiments.

It should be noted that with regard to an execution order of each processing such as an operation, a procedure, a step, a process, a stage, and the like in the device, the system, the program, and the method as recited in the claims, the specification, and the drawings, each processing can be realized in an optional order unless explicit description is made in particular such as "before" and "prior to" and an output of prior processing is used in subsequent processing. With regard to an operation flow in the claims, the specification, and the drawings, even when description has been made using "first", "next", "then" and the like for convenience sake, it is not meant that execution in this order is essential.

The invention claimed is:

1. A robot control device configured to control a robot to lift a workpiece supported by an environment, the robot control device comprising:
   a support force data acquisition section configured to acquire measurement data of a workpiece support force measured by a force sensor provided at the environment on which the workpiece is supported, the workpiece support force varying during the robot lifts the workpiece;
   a disturbance estimation section configured to estimate a disturbance value applied to the robot using state information of the robot; and
   a correction section configured to correct the disturbance value estimated by the disturbance estimation section or the state information inputted to the disturbance estimation section, using the measurement data acquired by the support force data acquisition section.

2. The robot control device according to claim 1, wherein the correction section is configured to:

obtain a varying workpiece load by subtracting the measurement data from a gravitational force applied to the workpiece, and correct the disturbance value by subtracting the varying workpiece load from the disturbance value.

3. The robot control device according to claim 2, wherein the disturbance estimation section is configured to estimate the disturbance value using, as the state information, measurement data of another force sensor configured to measure a force applied to the robot, and the correction section is configured to:

obtain a component of the force applied to the robot due to the varying workpiece load, and correct the disturbance value by subtracting the component from the disturbance value.

4. The robot control device according to claim 1, wherein the correction section is configured to:

obtain a varying workpiece load by subtracting the measurement data from a gravitational force applied to the workpiece, and correct the state information based on a state change due to the varying workpiece load, and the disturbance estimation section is configured to estimate the disturbance value using the state information corrected by the correction section.

5. The robot control device according to claim 4, wherein the robot includes a robot hand configured to grip the workpiece, and the correction section is configured to correct the state information by subtracting a component due to the varying workpiece load from measurement data of another force sensor configured to measure a force applied to the robot hand as the state information.

6. The robot control device according to claim 5, further comprising:

a follow command section configured to generate a command for operating the robot in accordance with the disturbance value in response to the disturbance value estimated by the disturbance estimation section exceeding a predetermined threshold value.

7. The robot control device according to claim 1, further comprising:

an operation command section configured to generate a command for stopping or retracting the robot in response to the disturbance value, which is corrected by the correction section or which is estimated by the disturbance estimation section using the state information corrected by the correction section, exceeding a predetermined threshold value.

8. The robot control device according to claim 1, wherein the disturbance estimation section is configured to acquire a resultant force of forces acting on the robot, acquire an internal force acting on the robot due to a mass of the robot, and estimate the disturbance value by subtracting the internal force from the resultant force.

9. A method of estimating a disturbance value applied to a robot which lifts a workpiece supported by an environment, the method comprising:

acquiring measurement data of a workpiece support force measured by a force sensor provided at the environment on which the workpiece is supported, wherein the workpiece support force varies during the robot lifts the workpiece;

transmitting the acquired measurement data to a robot control device configured to control the robot;

estimating, by the robot control device, a disturbance value applied to the robot using state information of the robot; and correcting, by the robot control device, the estimated disturbance value or the state information, using the acquired measurement data.

10. The method according to claim 9, further comprising:

obtaining, by the robot control device, a varying workpiece load by subtracting the acquired measurement data from a gravitational force applied to the workpiece, wherein in the correcting the estimated disturbance value or the state information, the varying workpiece load is subtracted from the estimated disturbance value.

11. A robot control device configured to control a robot to lift a workpiece supported by an environment, the robot control device comprising:

a processor configured to to acquire measurement data of a workpiece support force measured by a force sensor provided at the environment on which the workpiece is supported, the workpiece support force varying during the robot lifts the workpiece;

to estimate a disturbance value applied to the robot using state information of the robot; and to correct the estimated disturbance value or the state information, using the acquired measurement data.

12. The robot control device according to claim 11, wherein the processor is configured to:

obtain a varying workpiece load by subtracting the measurement data from a gravitational force applied to the workpiece, and correct the disturbance value by subtracting the varying workpiece load from the disturbance value.

13. The robot control device according to claim 12, wherein the processor is configured to estimate the disturbance value using, as the state information, measurement data of another force sensor configured to measure a force applied to the robot, obtain a component of the force applied to the robot due to the varying workpiece load, and correct the disturbance value by subtracting the component from the disturbance value.

14. The robot control device according to claim 11, wherein the processor is configured to:

obtain a varying workpiece load by subtracting the measurement data from a gravitational force applied to the workpiece, and correct the state information based on a state change due to the varying workpiece load, and estimate the disturbance value using the corrected state information.

15. The robot control device according to claim 14, wherein the robot includes a robot hand configured to grip the workpiece, and the processor is configured to correct the state information by subtracting a component due to the varying workpiece load from measurement data of another force sensor configured to measure a force applied to the robot hand as the state information.

16. The robot control device according to claim 15, wherein the processor is configured to generate a command for operating the robot in accordance with the disturbance value in response to the estimated disturbance value exceeding a predetermined threshold value.

17. The robot control device according to claim 11, wherein the processor is configured to generate a command for stopping or retracting the robot in response to the disturbance value, which is corrected or estimated by using the corrected state information, exceeding a predetermined threshold value.

* * * * *